(12) United States Patent
Brandt et al.

(10) Patent No.: US 7,741,958 B2
(45) Date of Patent: Jun. 22, 2010

(54) NETWORK CABLE FOR TRANSMITTING DATA AND POWER TO NETWORKED DEVICES

(75) Inventors: David D. Brandt, Milwaukee, WI (US); Wayne H. Wielebski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 938 days.

(21) Appl. No.: 11/363,386

(22) Filed: Feb. 27, 2006

(65) Prior Publication Data
US 2006/0145833 A1    Jul. 6, 2006

Related U.S. Application Data

(62) Division of application No. 10/662,753, filed on Sep. 15, 2003, now Pat. No. 7,034,662.

(51) Int. Cl.
*H04M 11/04* (2006.01)
(52) U.S. Cl. .............................. 340/310.11; 340/310.16; 340/310.18; 340/286.02; 340/854.9; 340/855.2; 370/419; 370/463; 375/257; 375/258; 375/259
(58) Field of Classification Search ............ 340/310.01, 340/310.05, 310.06, 310.02, 310.11, 310.16, 340/310.18, 286.02, 854.9, 855.2; 375/257, 375/258, 259; 370/419, 463
See application file for complete search history.

(56) References Cited

U.S. PATENT DOCUMENTS

| 4,642,607 | A | * | 2/1987 | Strom et al. ................. 307/104 |
| 4,903,006 | A | * | 2/1990 | Boomgaard ..................... 307/3 |
| 5,181,026 | A | * | 1/1993 | Granville ............... 340/870.28 |
| 5,864,094 | A | * | 1/1999 | Griffin .................... 174/105 R |
| 7,102,490 | B2 | * | 9/2006 | Flen et al. .............. 340/310.18 |

* cited by examiner

*Primary Examiner*—Tai T Nguyen
(74) *Attorney, Agent, or Firm*—Fletcher Yoder LLP; Alexander R. Kuszewski; John M. Miller

(57) ABSTRACT

The present technique relates to the distribution of power and data signals throughout a networked system. For example, three-phase power may be conducted to a device over a set of conductors. One of the conductors, however, may be configured to conduct, in conjunction with a neutral conductor, both one phase of three-phase power as well as data signals in accordance with a predetermined data communications protocol. As an alternate example, the present technique may comprise a set of a first power conductors configured to conduct three-phase power and a secondary power conductor which works in conjunction with an auxiliary conductor to conduct power and data-signals. Additionally, the present technique provides for the maintenance data communications and a level of power upon the interruption of three-phase power to a particular component or device.

19 Claims, 14 Drawing Sheets

NETWORK CABLE FOR TRANSMITTING DATA AND POWER TO NETWORKED DEVICES

CROSS-REFERENCE TO RELATED APPLICATIONS

This application is a divisional of Ser. No. 10/662,753, filed Sep. 15, 2003, entitled MULTI-FUNCTION INTEGRATED AUTOMATION CABLE SYSTEM AND METHOD in the name of David D. Brandt et al., now U.S. Pat. No. 7,034,662.

FIELD OF THE INVENTION

The present technique relates to power and data distribution within a networked system. More particularly, the present technique relates to distribution of both power and data signals over a power conductor.

BACKGROUND OF THE INVENTION

In a number of applications, networked systems require distribution of both power and data signals to and from any number of devices. For example, in industrial applications, a networked system may distribute power, typically three-phase power, as well as appropriate data signals to any number of locations. In traditional systems, power and data signals are transmitted over discrete wiring pathways. That is, power is distributed over dedicated power wires and data is distributed over dedicated data wires, both of which are disposed in separate protective conduits or cable jackets tubing.

By way of example, networked control for a motor may require three wires for the transmission of three-phase power, one or more wires for a second level of power, an earth ground wire for coupling to ground, a neutral wire for return power signals and a pair of data wires for the communication of data signals. Thus, a traditional system may require nine or more discrete wires for operation. Some systems also use a further conductor for override or emergency data communication. In turn, this may lead to increased costs with respect to both manufacturing and installation. Moreover, the large number of conductors required increases the likelihood of a problem, such as a short, occurring in one of the wires. This too may increase costs, particularly maintenance costs.

In more complex systems, power and data signals may be distributed to and from any number of devices, sensors and control circuits all working in cooperation. Accordingly, the system may be interconnected with trunk cables and branch cables extending from the trunk cables by conductors which serve as tapping junctions to the branch cables. However, in many traditional networks, if an electrically upstream device is brought out of operation, then the electrically downstream devices, although functioning properly, may also be brought out of operation. This may lead to undesired downtimes where repair perturbs overall operation of the entire installation. Thus, it would be advantageous to independently interrupt power to the various components of such systems.

Traditionally, manual disconnects are provided downstream of the trunk cables and connectors for linking branch cables to the trunk cables. Accordingly, a separate device is necessary solely for the selective, more particularly manual, interruption of power to a component. This again may lead to increased costs both in manufacture and installation.

From time to time, problems may occur in certain devices of the network that require a total or partial shut down of the device or system. Indeed, operations may be brought to a total or partial halt, for example, to diagnose and repair the problem in a specific device. Additionally, total or partial system shutdown may occur in response to an override condition of the system in accordance with an override protocol.

During a shutdown, it may be necessary to disengage operating power to a load, such as a motor, for the purposes of repair. Generally, while a component is undergoing repair, it may be disengaged from main power and, as such, becomes divorced from the system. In conventional networked systems, this may also lead to a loss of operating power, and even data, to the control devices connected to the load, such as relays, protective circuitry, sensing circuitry, actuators, controllers, drives, and so forth. Without these power and data signals, it may be difficult for a technician to conduct diagnostic analysis of the component or system as a whole. This can lead to increased repair and downtimes for both the system and the component. Accordingly, it would be desirable, during diagnostic tests of the system, to disengage the main power while maintaining a second level of power and data signals to and from one or more disengaged components.

As discussed below, the present technique addresses many of these concerns.

SUMMARY OF THE INVENTION

According to one aspect, the present technique comprises a method for transmitting power and data signals. The method comprises, applying three-phase power to a device over a set of power conductors. Additionally, one of the power conductors applies power as well as data signals to the device in conjunction with a neutral conductor.

According to another aspect, the present technique comprises a cable including three conductors configured to conduct three-phase power to a device. The cable further comprises a fourth conductor configured to transmit data signals to the device in conjunction with one of the power conductors.

According to yet another aspect, the present technique comprises a cable including a set of power conductors configured to conduct three-phase power to a device. The cable further comprises a secondary power conductor configured to conduct a secondary power as well as data signals, the secondary power conductor working in conjunction with an auxiliary conductor.

According to yet another aspect, the present technique comprises a system for conducting data signals and power throughout a network. The system comprises a data signal source configured to provide data signals in accordance with a desired data communication protocol and a device configured to be powered and to receive the data signals. The system further comprises a cable coupled between the data signal source and the device, wherein the cable is configured to conduct both data signals and power to the device.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
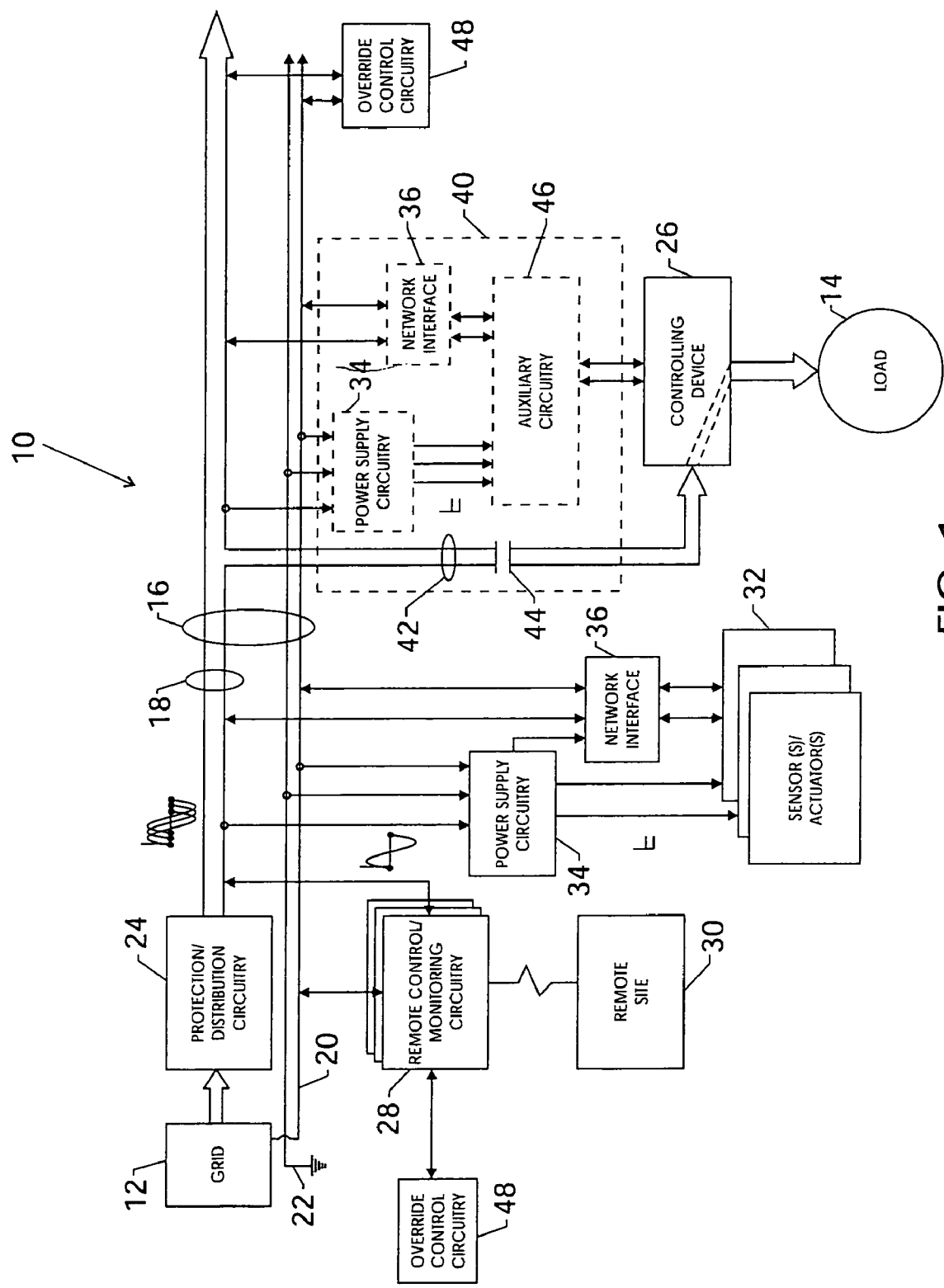
FIG. 1 is a diagram of a portion of an exemplary networked system incorporating features of the present invention.

In industrial applications, efficient distribution of power and data signals is a motivating concern. Referring to FIG. 1, an exemplary section of a power and data distribution system 10 is presented. Although, for the purposes of explanation, the present embodiment relates to an industrial application, the present technique can be applied to any number of settings in which the efficient distribution of power and data is a concern. Returning to the present embodiment, the power and data distribution system 10 comprises a three-phase power source 12, such as a generator or power grid. The three-phase power may be ac power, such as 480V power, that powers a load 14. For example, the load 14 may be a motor that operates on three-phase 480Vac power. For the present purposes, any voltage or current rating of ac power may be accommodated. Moreover, the power source 12 may be configured to provide other levels and kinds of power, such as 24Vdc, along with the primary three-phase power.

To achieve efficient operation, it may be advantageous for the load 14 to operate in response to and in cooperation with other system conditions. That is, the load 14 may be more efficient if operated in light of, for example, the status or condition of other motors, sensors, controllers, or any other components disposed throughout the system 10. Accordingly, the system 10 facilitates the transmission of data signals to and from these various components.

In the exemplary system 10, three-phase power and the data signals may be transmitted and communicated over a plurality of conductors 16. More particularly, three-phase power may be respectively conducted on power conductors 18. As further discussed below, data signals may be transmitted throughout the system 10 over a neutral conductor 20 and one of the power conductors 18. To conduct power and data signals concurrently over a power conductor, the data signals may be transmitted in accordance with a data communications protocol. Additionally, for protection of the system 10, as well as to comply with commonly accepted design standards, the system 10 may comprise an earth ground conductor 22 that provides a path to earth ground. Each of these conductors, as discussed further below, may be placed into a single cable thereby providing a simpler and more compact configuration.

To protect the system 10 against power surges, protection circuitry 24 may be disposed electrically downstream of the power source 12 and upstream of all or a large portion of the remainder of the network. However, it is worth note that the protection circuitry 24 may also be placed electrically proximate to the load or component it protects. Moreover, the protection circuitry 24 may even be integrated into the network component itself. Simply put, the protection circuitry 24 may be distributed and decentralized with respect to the networked system. The protection circuitry 24 may comprise, for example, circuit breakers, as well as fuses, each designed to prevent inappropriate power levels from reaching the remainder of the power and data distribution system 10 as well as the particular network component. Moreover, as discussed in detail below, the protection circuitry 24 may be configured to facilitate remote triggering and resetting thereof.

Coupled to the conductors 16 and located electrically between the load 14 and source 12 may be a controlling device 26, such as a relay, motor controller or motor starter. The controlling device 26, in response to an appropriate data signal, may interrupt three-phase power to the load 14. As precedingly discussed, a decision to interrupt power to the load 14 may be based on monitored conditions of the system 10. Thus, the system 10 will typically include a number of sensors and circuits disposed throughout the system.

Advantageously, data collected by these circuits or sensors may be transmitted to a central location, such as remote control and monitoring circuitry 28. Remote control and monitoring circuitry 28 may function as a receiving and processing center for any number of data signals. Additionally, the monitoring circuitry 28 may generate appropriate response signals for various components in the system 10. In other words, the remote control and monitoring circuitry 28 may act as a nerve center for the system 10. It should be understood, however, that circuitry 28 may include one or more individual controllers, computers, and so forth, in a single or remote locations. Moreover, it should be understood that the control circuitry 28 may be distributed throughout the system. That is, the control circuitry 28 may be electrically positioned proximate to the various network components.

Indeed, the control circuitry 28 may even be integrated into the network components themselves. In such systems, the network would not necessarily contain a "central control", but rather an entire collection of remote control and monitoring circuits 28 working in tandem with one another.

In operation, the remote control and monitoring circuitry 28 may receive data signals from throughout the power and data distribution system 10. It is worth repeating, however, that the monitoring and control circuitry 28 may be distributed and decentralized throughout the network. As further discussed below, these data signals may be transmitted over one of the power conductors 18 and a neutral conductor 20 working in cooperation with one another (e.g. via a differential signal protocol). Accordingly, the exemplary remote control circuitry 28 is coupled to the neutral conductor 20, as well as to the appropriate power conductor 18. Coupled to the remote control and monitoring circuitry 28 may be a remote site 30. The remote site 30 may provide a location for a network administrator or operator to view the signals received by the control and monitoring circuitry 28, determine the status of system 10 perform control functions, and so forth. Moreover, the remote site 30 may provide a mechanism through which the operator may remotely and manually control various individual or sets of components or operations of the networked system 10.

The remote control and monitoring circuitry 28 may, for example, receive data signals from sensors or actuators 32 disposed throughout the system 10. To operate, the sensors and actuators 32, and the various networked devices 26 may require a level of power different than the exemplary 480V ac power. For example, the sensors and actuators 32 may require a level of power such as 110V single phase ac or 24Vdc. Accordingly, power supply circuitry 34 may be disposed electrically between the power source 12 and the sensors and actuators 32. Advantageously, the exemplary power supply circuitry 34 is coupled to a power conductor 18, the neutral conductor 20 and the earth ground conductor 22. Thus, the power supply circuitry may receive a single phase of the three-phase power and appropriately convert this power to an operable power level. Moreover, the power supply circuitry may receive operating power from the power conductor 18. By way of example, the power supply circuitry 34 may rectify the 110V single phase ac power to a 24Vdc power. Additionally, the power supply circuitry 34 may be coupled to the ground conductor 22 so as to provide the power supply circuitry with a path to earth ground.

With appropriate power, the sensors and actuators 32 may receive and transmit data signals throughout the system 10. By way of example, the sensor may comprise a sensor indicative of the status or position of a machine component or workpiece. That is, the sensor 32 may be configured to indicate whether the component or workpiece is in an appropriate position to permit a programmer or manually controlled operation to proceed. Additionally, again by way of example, actuators may comprise any suitable devices, such as switches, relays, motors, control valves, pumps, hydraulic or pneumatic cylinders and so forth.

The data obtained by the sensors 32 or indicative of the condition of the actuators 32 may not be in a form that is interpretable by the remote control and monitoring circuitry 28. Accordingly, network interface circuitry 36 translates these signals into data signals that are more appropriate. That is, the network interface may translate the raw data into data signals in accordance with the predetermined data communications protocol. Such protocols may include standard protocols known in the art, such as DeviceNet protocol, ControlNet protocol, ProfiBus protocol, and so forth. Additionally, the network interface circuitry 36 may translate return data signals from the remote control and monitoring circuitry 28 to the sensors or actuators 32. Again to transmit the data signals, the network interface is electrically coupled to the appropriate power conductor, that is the power conductor 18 also carrying data signals, as well as the neutral conductor 20. In operation, the interface circuitry 36 translates the received data signals and sends response signals which, in turn, instruct an actuator in its function.

Once these signals from the sensors and actuators 32 are received by the remote control and monitoring circuitry 28, they may be interpreted so as to determine the appropriate response signals for the controlling device 26, thereby controlling the load 14. The remote control and monitoring circuitry 28 may conduct, over the conductors 16, the appropriate data signals throughout the system 10. Coupled to the conductors 16, may be a power and data transfer assembly 40 which taps off of the conductors 16 and conducts the appropriate power and data signals to the controlling device 26 and, in turn, to the load 14. In the illustrated embodiment, a set of branch power conductors 42 conduct three-phase power through the power and data transfer assembly 40 and into controlling device 26. Coupled to these branch conductors may be a disconnect 44 configured to interrupt at least one phase of the three-phase power prior to the power reaching the controlling device 26, as described below. Advantageously, the disconnect facilitates power interruption to the load 14 upstream of the device 26, thereby allowing, if desired, one phase of power to reach the controlling device 26 or load 14. Additionally, the power and data transfer assembly 40 conducts network data signals to the controlling device 26, thereby controlling the load 14. That is, the transfer assembly 40 may receive data signals and, in turn, produce a signal which trips the controlling device 26, thereby interrupting power to the load 14.

Also, within the power and data transfer assembly 40 may be various types of auxiliary circuitry 46. The auxiliary circuitry may be configured to transmit signals indicative of the condition of the controlling device 26. For example, the auxiliary circuitry may produce a response signal if a relay is tripped, thereby confirming loss of power to the load 14. However, the auxiliary circuitry 46 may provide any number of functions to the power and data transfer assembly 40 as well as to the system 10. Indeed, the auxiliary circuitry 46 may be employed to present a secondary signal indicative of the status of any number of system conditions.

The auxiliary circuitry 46 may operate from power other than that provided by the main (e.g. 480V) ac three-phase power. Accordingly, power supply circuitry 34 may be employed to alter the power signal from the power conductors to a level more appropriate for the auxiliary circuitry 46. As discussed above, power supply circuitry 34 may be coupled to one of the power conductors, the neutral conductor 20, and an earth ground 22. The power supply circuitry 34 receives one phase of the three-phase power and converts this power to a power level more appropriate to the auxiliary circuitry 46. Again, by way of example, the power supply circuitry 34 may rectify and convert single phase 110V ac power to 24Vdc power. Once appropriately conditioned or converted, the power supply circuitry provides sufficient power to the auxiliary circuitry 46 for operation. Additionally, the auxiliary circuitry 46 may then transmit this conditioned power, if appropriate, to the controlling device 26 for operation. However, if the controlling device 26 requires a power level different than that of the auxiliary circuitry 46, then the power supply circuitry 34 may be directly coupled to the controlling device 26 to provide an appropriate power level.

Similar to the sensors and actuators 32, the auxiliary circuitry 46 may not provide data signals interpretable by the remote control and monitoring circuitry 28 and vice-versa. Accordingly, network interface circuitry 36 may also be provided within the power and data transfer assembly 40. As discussed above, the network interface circuitry receives data signals from the auxiliary circuitry 46 and translates the signals into data signals comprehendible by the remote control and monitoring circuitry 28, that is, data signals in accordance with the data communications protocol in use. To conduct these appropriately translated data signals to the remote control and monitoring circuitry, the network interface circuitry 36 is coupled to the appropriate power conductor (i.e., the power conductor conducting both data and power) and a neutral conductor 20. It is again worth nothing that the remote control and monitoring circuitry 28 may be distributed throughout the network and may also be electrically proximate to the respective network components. Additionally, the network interface may receive data signals from the remote control and monitoring circuitry and translate such signals into signals appropriately understandable by the auxiliary circuitry 46. In turn, the auxiliary circuitry may transmit the translated signals to the controlling device 26, thereby actuating the controlling device 26 and interrupting power to the load 14. It is worth note, however, that the network interface, if so desired, may bypass the auxiliary circuitry 46 and couple directly to the controlling device 26. Indeed, if so desired, the controlling device may bypass the assembly 40 and be directly coupled to the conductors 16.

In many instances, it may be necessary to interrupt power to the load in response to an override condition occurring in the system 10. Accordingly, the system 10 may include override control circuitry 48. The override circuitry 48 receives data signals from the network and determines, in accordance with an override protocol, whether an override signal is to be transmitted. If so, then the override circuitry produces this signal in accordance with both the override protocol as well as the data communications protocol, thereby interrupting power to the load 14. The override circuitry 48 may be centralized in a central control configuration or distributed throughout the system. For example, override circuitry 48 may be integrated into the components of the network. Indeed, the override circuitry 48 may be integrated into a given network component and configured to terminate power to the component in response to a detected override condition within the component. Simply put, the component may terminate power to itself. Moreover, the override circuitry 48 within a component may be capable of sending a signal that terminates operation and power to the entire system. Depending on the nature and origin of the interrupt command, any number of override protocols may be executed.

For the purposes of explanation, the networked system or power and data distribution system 10 may implement a simple press operation. In this explanatory example, the load 14 may be viewed as a motor configured to drive a press plunger in a reciprocating manner. The exemplary press, more particularly the motor of the press, may be powered by three-phase 480Vac power. Coupled between the power source and the press motor may be a controlling device 26, such as a motor controller or contactor. When open, the contactor would prevent three-phase power from reaching the motor, thereby disabling the press. However, the contactor may operate based upon logic to determine when and for how long power to the motor should or should not be applied.

Accordingly, the various sensors 32 throughout the system may provide data, once translated by network interface circuitry 36, to the remote control and monitoring circuitry 28 which, in turn, analyzes this data and produces a return data signal indicative of what the desired contractor status should be. This signal may then be transmitted over the appropriate power conductor 18 (i.e., the conductor that conducts both the data signals and one phase of the ac power) and the neutral 20 to the power and data transfer assembly 40.

Once received by the assembly 40, the network interface circuitry 36 disposed therein translates this signal to one which is more appropriately understood by either the auxiliary circuitry 46 or the controlling device 26. This signal would then instruct the controlling device (i.e., the contactor) to either maintain power to the motor or to interrupt power in response to a system condition.

Additionally, and continuing the example, the override circuitry 48 may produce response signals so as to prevent the motor (i.e., load 14) from operating because of a certain condition of the system 10. By way of example, a sensor 32 may be coupled to a press door or guard and configured to indicate whether this guard is either in an opened or closed position. The sensor 32 would then be scanned periodically, or, alternatively, when the door is open, the sensor would then transmit an indicative signal to the network interface which would in turn translate the signal to one appropriate for the remote control and monitoring circuitry 28. If the signal is related to an override event, the signal is transmitted to override control circuitry 48 or to both that circuitry and the remote control monitoring circuitry 28. The override circuitry interprets the signals and determines, in accordance with an override protocol, that the press guard is open and, as such, the motor should not be operable. The override circuitry would then create a data signal, in accordance with a predetermined override protocol, and transmit this newly created data signal, over the appropriate conductors, to the power and data transfer assembly 40. Once received, the power and data transfer assembly, by way of the network interface circuitry 36, appropriately instructs the controlling device to trip the contactor open and, as such, prevent operation of the motor until the sensor indicates that the door is closed. Advantageously, the override circuitry 48 thus functions in parallel with the control circuitry, and transmits coordinated signals in its own protocol over the same conductors.

Figure 2:
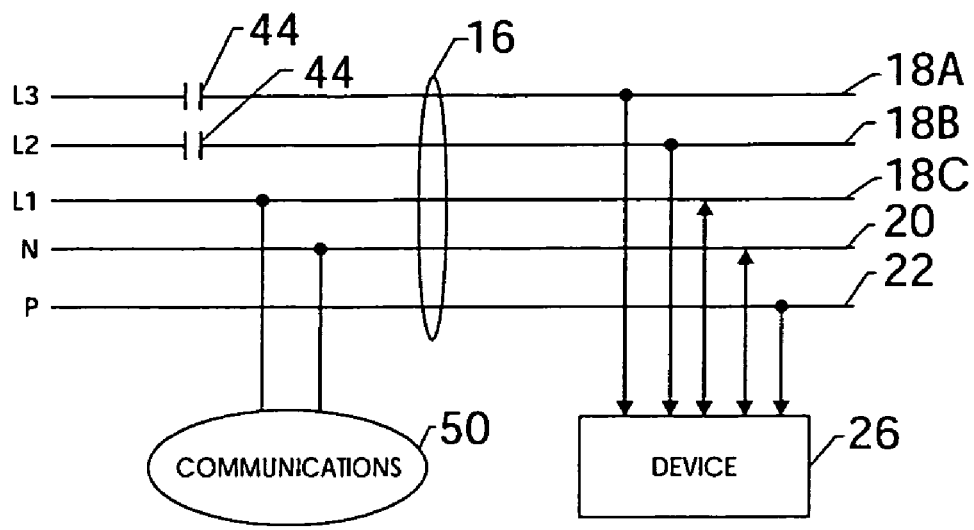
FIG. 2 is a schematic of a cable assembly having a plurality of conductors for the exemplary system of FIG. 1, which conduct power and data signals to a networked device.

Turning next to FIG. 2, the exemplary network preferably utilizes a cable assembly grouping the conductors 16 for coupling to the control device 26. Although the exemplary network relates to conductors 16 coupled to a control device 26, which in turn is coupled to a load 14, the conductors 16 may be configured to be coupled to any number of electronic components. Simply put, the conductors 16 may be configured to provide data signals as well as power to any number of networked components or devices within the system. Moreover, it should be noted that any number of network components may be electrically disposed between the conductors 16 and the device 26. However, for the purpose of explanation, these components are not illustrated. Returning to the exemplary portion of the network, the conductors 16 comprise three power conductors 18a, 18b, and 18c each conducting a phase of three-phase power. Additionally, as discussed above, the conductors 16 include a neutral conductor 20 and a ground conductor 22 coupled to earth ground. Advantageously, conductors 18a and 18b may include disconnects 44 configured to selectively interrupt the phases of power carried by these conductors.

To operate, the device 26 may be coupled to each of the power conductors 18a, 18b and 18c, and thereby receive three-phase power. Additionally, data signals 50 may be communicated to and from the device over an appropriate conductor (i.e., the power conductor carrying both power and data signals) 18c and the neutral conductor 20 working in conjunction with one another. Advantageously, the communication signals or data signals 50 may be in accordance with the data communications protocol that facilitates the transmission of power and data concurrently over a power conductor. For example, the data communications protocol may comprise a standard protocol adapted to provided data signals over power, such as a protocol known as HomePlug, or similar technologies. Upon interruption of power conductors 18a and 18b via disconnects 44, power conductor 18c, working in conjunction with neutral conductor 20, continues to provide at least one phase of ac power to the device 26, as well as data signals as indicated generally at reference numeral 50. The use of the power conductor 18c and neutral conductor 20 is particularly preferred where the communications protocol relies upon differential communication. Accordingly, the device 26 may remain operable in, for example, a diagnostic state (i.e., allow the device to maintain data communications with the remainder of the system 10 while disconnects 44 are open). Advantageously, such communications may facilitate the repair and/or maintenance of a device even when the device 26 is no longer fully operational (i.e. cannot power the load). That is, the device 26 may include: a fully operational mode, wherein all appropriate power and data signals are communicated to the device; a maintenance mode, wherein power signals may be partially interrupted but data signals are maintained; and a service mode, wherein all power signals are disconnected.

The conductor assembly of FIG. 2 illustrates that, in conjunction with a ground conductor for the purposes of circuit protection and compliance with design standards, three-phase power and data communications signals can be networked throughout a system 10 over as few as four conductors. In comparison to traditional systems which may require nine or more conductors for the same purpose, the present technique is significantly more efficient.

Figure 3:
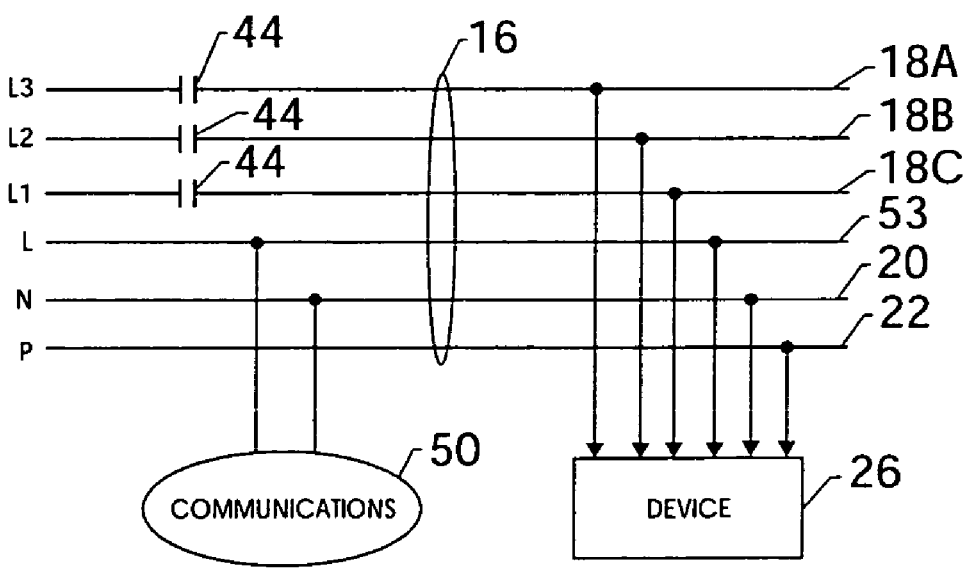
FIG. 3 is an electrical schematic of an alternate embodiment of a cable assembly for conducting power and data signals to a device.

An alternate conductor configuration, as illustrated in FIG. 3, may comprise six conductors 16 including three primary power conductors 18a, 18b, and 18c, a secondary power conductor 52, a neutral conductor 20 and a earth ground conductor 22. In this arrangement, similar to the foregoing arrangement, three-phase power is conducted over primary power conductors 18a, 18b and 18c. Over a secondary power conductor 52, a second power level, which may be independent of the primary three-phase power conductors, may also be carried. The second power level may be one of any number of power levels. For example, the second power may be a 24Vdc or a single phase 110Vac. Additionally, the secondary power conductor may carry the data signals in accordance with the predetermined data communications protocol as before. Accordingly, when power to the primary conductors 18a, 18b and 18c is interrupted by the disconnects 44, one phase of power and data signals remain over the secondary power conductor 52. Because the device 26 may be coupled to the secondary power conductor 52 in conjunction with the auxiliary conductor 53, the device retains the second power level as well as data communications. Indeed, the communication signals or data signals, as indicated at reference numeral 50 may be transmitted between the system and the device over the secondary power conductor 52 working in conjunction with the auxiliary conductor 53 in accordance with a data communications protocol.

Figure 4:
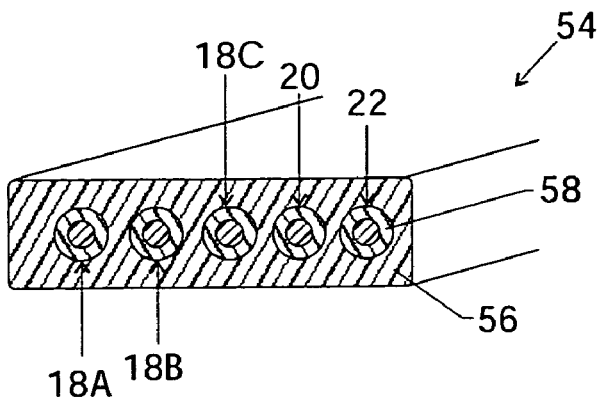
FIG. 4 is a cross-section view of an exemplary cable including a plurality of conductors and having a substantially rectangular profile.
Figure 5:
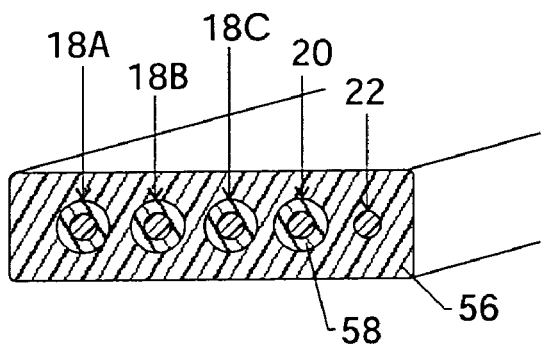
FIG. 5 is a cross-section view of an alternate arrangement for an exemplary cable having a substantially rectangular profile, the alternate arrangement including an unsheathed conductor.

Each of these conductors 16 discussed above, as illustrated by FIGS. 4 and 5, may be disposed within a single cable 54 having any suitable physical configuration, such as a substantially rectangular profile. The cable 54 may comprise a universal jacket 56 within which each of the conductors 18a, 18b, 18c, 20 and 22 are disposed. Advantageously, the universal jacket 56 may be configured so as to facilitate open wiring of the cable system. That is, the universal jacket may be formed of an insulative material that is crush resistant. Advantageously, cabling configured as such may be run throughout the system without protective conduit tubing. Additionally, to further protect each of the individual conductors, the conductors within the cable may also all include individual jackets 58 disposed about each of the conductors as shown in FIG. 4. However, in an alternative configuration, as illustrated in FIG. 5, the ground conductor 22, or other conductors of the cable, need not be placed in an individual jacket 58. Because the ground conductor 22 does not carry a signal, an individual jacket may not be required. Additionally, in the interests of efficient manufacture and reducing costs, the remainder of the conductors may also reside intimately in contact with the universal jacket, that is the cable 54 need not include any individual jackets 58.

Figure 6:
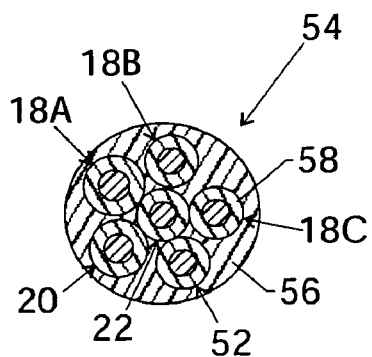
FIG. 6 is an alternate arrangement for an exemplary cable having a substantially circular profile.
Figure 7:
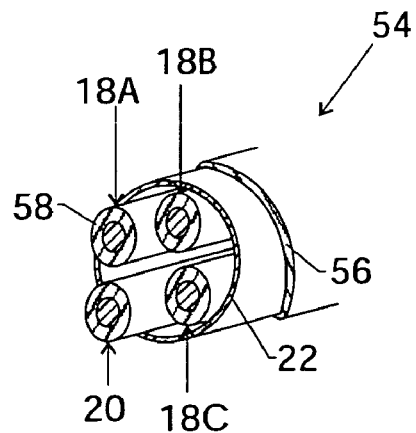
FIG. 7 is a cross-section view of an alternate arrangement for an exemplary cable having a substantially circular profile and including a conductive layer disposed circumferentially about the remaining conductors.

The cable 54, as illustrated in FIGS. 6 and 7, may also present a circular profile. In this arrangement, the cable 54 comprises six conductors: three primary power conductors 18a, 18b and 18c, a secondary power conductor 52 and an auxiliary-conductor 53 carrying a second power level and data signals, and an earth ground conductor 22. Advantageously, the circular profile may facilitate cabling of the system 10 in relatively tight and narrow wiring pathways, and facilitate multi-directional bending where required. As shown in FIG. 7, an alternate arrangement of a circular cable 54 comprises a ground conductor layer 22 circumscribed about the individual jackets 58 of the power conductors 18a, 18b and 18c and the neutral conductor 20. Advantageously, the ground conductor layer 22 may be a metal structure that provides structural rigidity to the overall cable 54 and can improve the crush resistance of the cable 54. The ground layer 22 may also advantageously provide EMI (Electro-Magnetic Interference) shielding to the remainder of the conductors in the cable 54.

Figure 8:
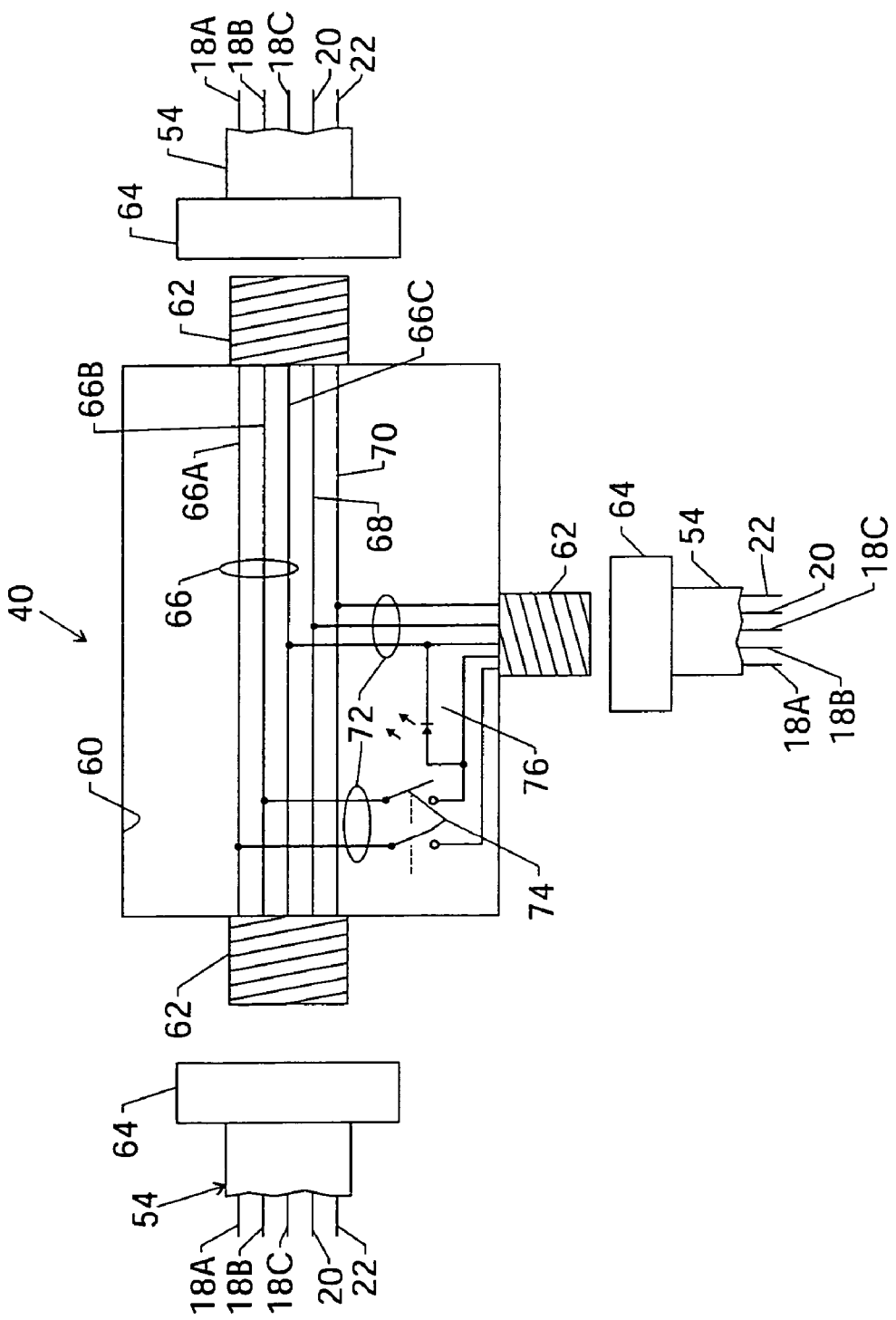
FIG. 8 is a schematic of a power and data transfer assembly having a set of branch conductors respectively coupled to a set of primary conductors.

To couple the cabling 54 to a device such as a relay, disconnect, motor or any other load, a power and data transfer assembly 40, as illustrated in FIG. 8, may be employed. The transfer assembly 40 comprises a body 60 advantageously formed of corrosion resistant rigid materials, such as high density polyethylene (HDPE) or any suitable material or materials, including a variety of plastics. Disposed on the exterior of the body 60 may be a set of threaded stems 62 configured to threadingly engage threaded connectors 64 coupled to the ends of cables 54. Advantageously, the threaded stems 62 and connectors 64 engage corresponding conductors of the cable 54 and the power and data transfer assembly 40. This may be facilitated by any number of techniques, such as pins and corresponding slots or sockets, well-known to those of ordinary skill in the art.

Within the assembly 40 are the primary conductors, including three-phase power conductors 66a, 66b, and 66c corresponding to the three-phase power conductors 18a, 18b, and 18c of the cables 54 discussed above, a neutral conductor 68 corresponding to the neutral conductor 20 of the cable 54, and an earth ground conductor 70 corresponding to earth ground conductor 22 of the cable 54. Once coupled to the appropriate cables 54, the power and data transfer assembly 40 is capable of conducting three-phase power over the power conductors 66 as well as data signals over one of the power conductors 66 working in conjunction with the neutral conductor 68.

The transfer assembly 40 may also include a plurality of tap conductors respectively coupled to the primary power conductors 66a, 66b and 66c, neutral conductor 68 and earth ground conductor 70. Advantageously, the tap conductors 72 provide an electrical pathway for distribution of three-phase power and data signals to downstream circuitry, such as a second device. That is, the transfer assembly 40 may be viewed as a "tee" assembly for interconnecting a plurality of downstream devices to an upstream source or device. In operation, power and data are conducted into the assembly from an input cable 54 (as exemplified by the left-most cable input in FIG. 8) through the power and data transfer assembly 40 via the primary and tap conductors and out to output cables 54 (as illustrated by the lower-most and right-most cable assemblies of FIG. 8). Thus, the appropriate power and data signals may be received from a single source and distributed to a plurality of locations or devices.

By tapping the conductors to the respective devices, the power and data transfer assembly 40 may include any number of integrated features which affect or indicate the status of the branched devices individually. For example, the tap conductors carrying two phases of three phase power, (i.e., the tap conductors coupled to power conductors 66a and 66b) may comprise disconnects, such as switches 74. The switches 74 may be any number of switch types, such as rotary switches or momentary contact switches. In the exemplary assembly 40 of FIG. 8, switches 74 facilitate interruption of two phases of three-phase power to a tap device while maintaining all three phases of power to be transmitted to downstream devices. That is, the tap device may be partially disengaged independently of the remaining devices in the system.

Advantageously, the partial interruption of tap conductors 72 maintains one phase of three-phase power and data signals to the tap device. In the exemplary assembly 40, tap conductors 72 that are not disconnected by such interruption include conductors respectively coupled to the power conductor carrying both data and power signals (i.e., conductor 66c) as well as to the neutral conductor 68. Thus, the tap device, although not able to power the load, still receives sufficient power for its own operation and retains communication abilities with the remainder of the system.

Additionally, the power and data transfer assembly 40 may include an indicator 76, such as an LED, disposed on any of the conductors, particularly on the interruptible tap conductors. If the switches 74 are in a closed position, then current will flow through the LEDs and into the secondary device. Accordingly, the LED will be illuminated thereby indicating an active status of a particular tap conductor. However, if the switch 74 is in the open position, current will not flow through the appropriate tap conductor and, as such, the LED will be inactive. Moreover, the LED indicators may be configured to provide both and indication of voltage as well as an indication of current. Thus, simply by viewing the status of the LED, an operator or technician is able to determine if a switch has been triggered. That is, a technician may be able to visually determine or verify if a given network component or section is active or "hot". Clearly, other indicator circuits, logic, and so forth may be envisaged to provide similar visible indication of the state of data or power in the conductors. In this and all of the embodiments, additional features, such as lockout mechanisms, may be provided in assembly do to facilitate servicing. As will be appreciated by those skilled in the art, such mechanisms generally enable a service technician or electrician to positively prevent physical switching of the switches 74 during periods of servicing, as via padlock or similar device.

Furthermore, by integrating switches and indicators into the power and data transfer assembly 40, the requirement of additional interconnected components may be obviated. In other words, additional switching components or indicators electrically disposed between the power and data transfer assembly and the downstream cable or device may no longer be necessary. Advantageously, this reduction in parts can lead to more convenient operation, simpler installation, as well as reduction in maintenance costs.

Figure 9:
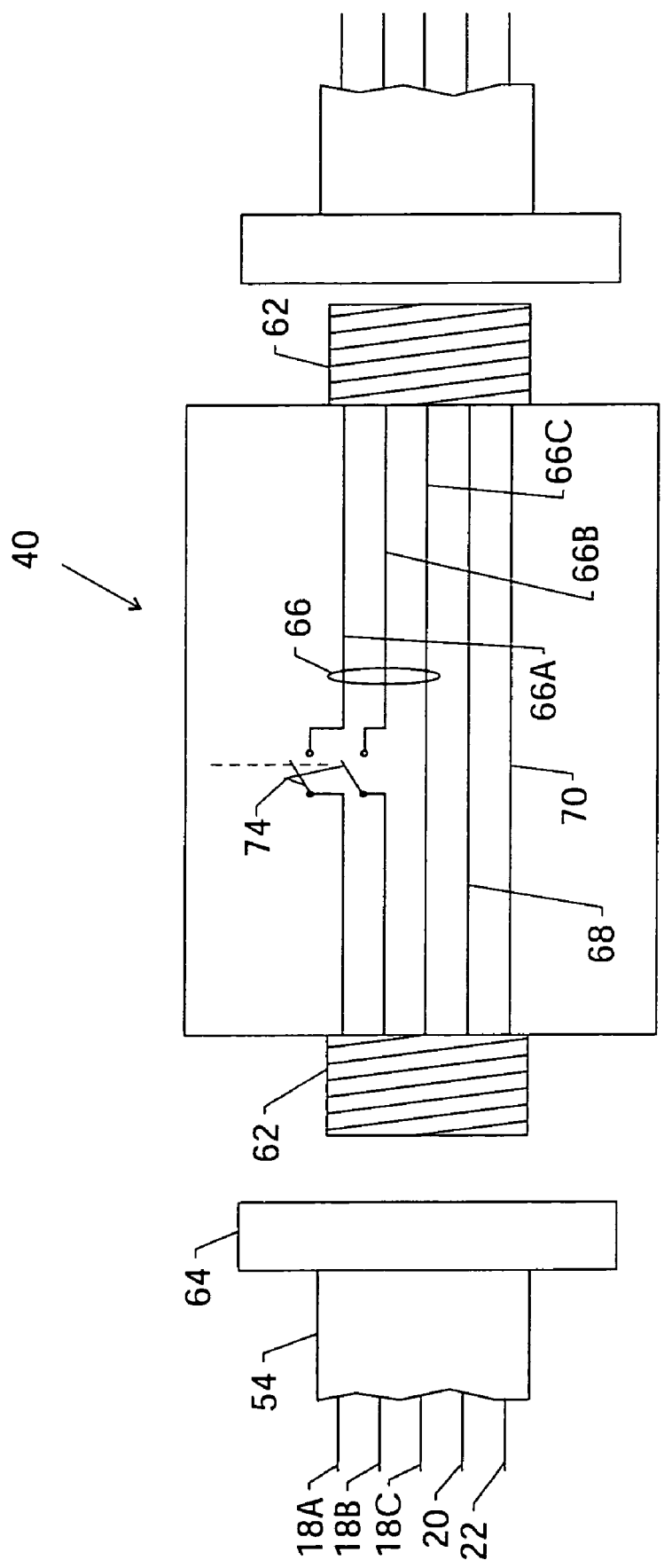
FIG. 9 is a schematic of a power and data transfer assembly having a set of internal disconnects.

In certain instances, such as a terminal end of a network, it may be advantageous to provide a coupling to a single device. As illustrated in FIG. 9, the power and data transfer assembly 40 may present a simple coupling for input conductors from the system to output conductors for a device. Moreover, the power and data transfer assembly 40 may include disconnects, such as switches 74, that disconnect two phases of three-phase power to a downstream device while retaining one phase of three-phase power and data signals to the device. Advantageously, by employing the assembly 40, devices downstream of the power and data transfer assembly may be interrupted from two phases of the three-phase power while those upstream remain operable.

Figure 10:
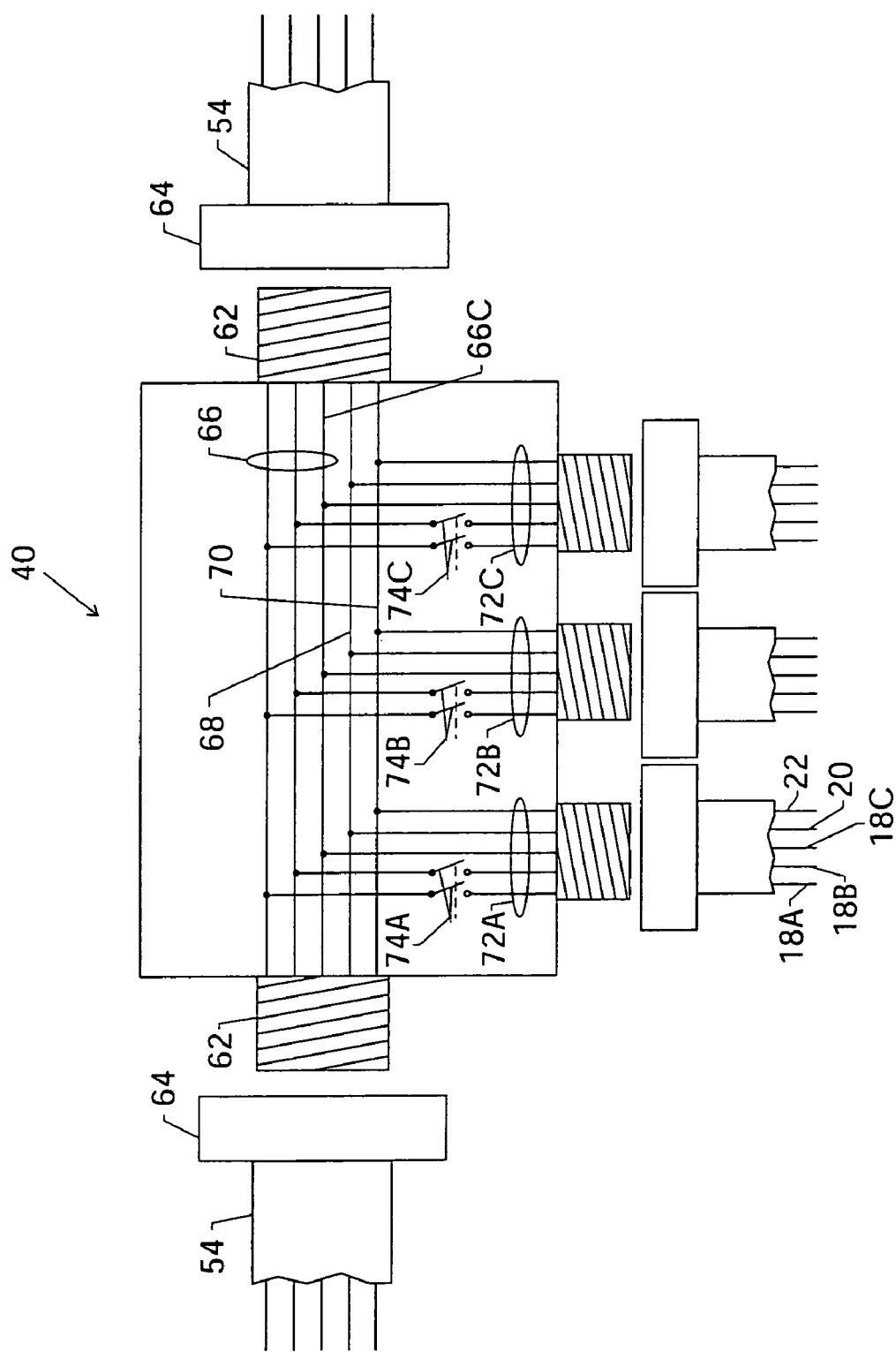
FIG. 10 is a schematic of a power and data transfer assembly having a plurality of sets of branch conductors respectively connected to a single set of primary conductors.

In yet other instances, it may be advantageous to independently distribute power and data signals to a plurality of downstream devices via a single assembly 40. Accordingly, FIG. 10 illustrates a power and data transfer assembly 40 including a plurality of sets of tap conductors 72a, 72b and 72c. Each set of tap conductors may include disconnects, such as switches 74a, 74b, and 74c, that disconnect two phases of three-phase power to the respective downstream devices. Thus, the power and data transfer assembly 40 allows for independent interruption of two phases of three-phase power to the respective downstream devices. Because the tap conductors may be configured to remain coupled to the power conductor carrying both power and data signals, that is conductor 66c, and to the neutral conductor 68, one phase of three-phase power and data signals may still be delivered to the respective downstream devices. Advantageously, the devices may remain networked to the system even though two phases three-phase power have been-disconnected therefrom.

Figure 11:
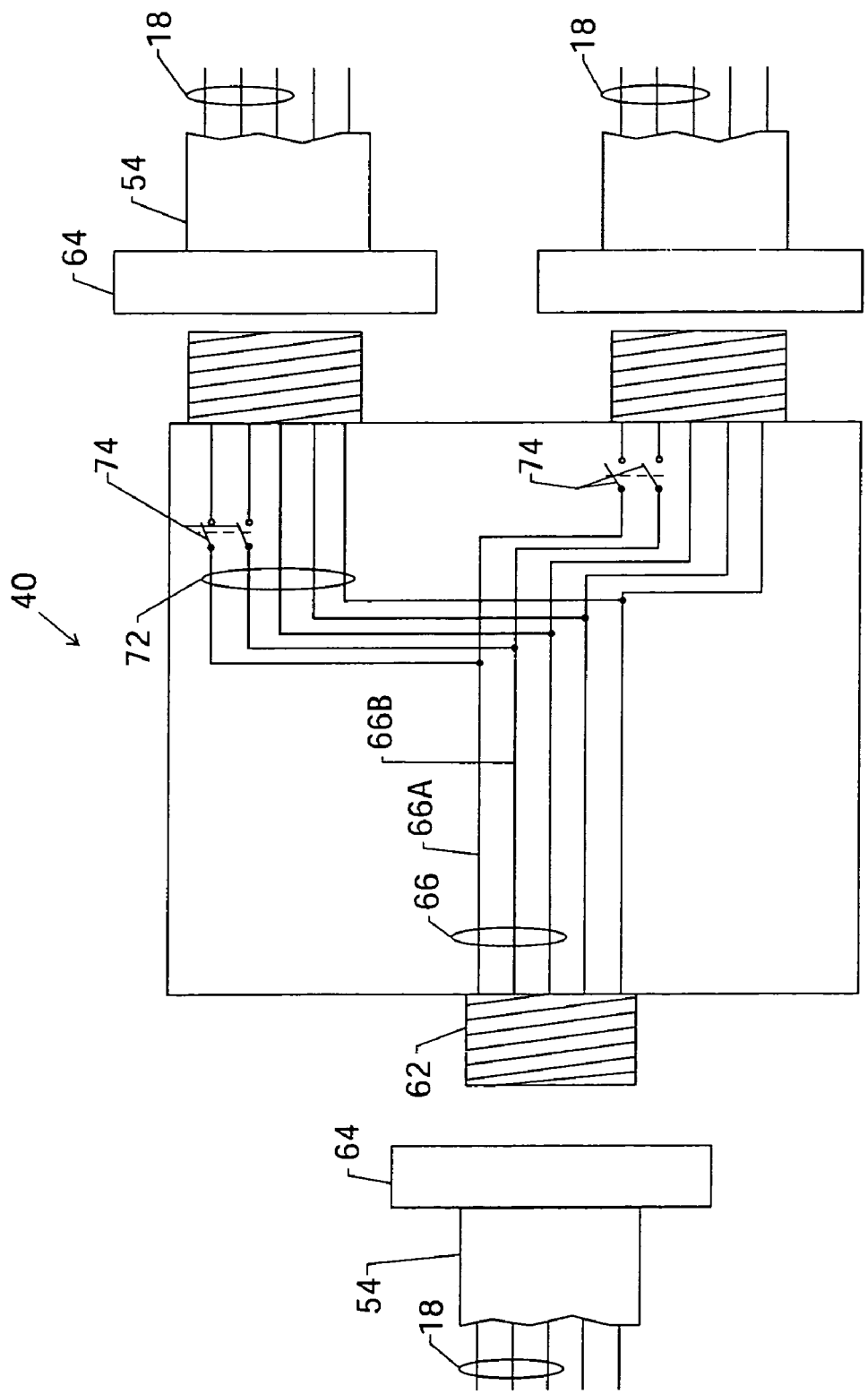
FIG. 11 is a schematic of a power and data transfer assembly having electrical conductors in a Y-adapter configuration.

Turning next to FIG. 11, in this arrangement, the power conductors 66a, 66b and 66c are arranged with the tap conductors 72 in a Y-pattern with the primary conductors. Advantageously, the Y-pattern assembly may facilitate tapping of the power and data signals to better match the spatial configuration of downstream devices and to accommodate various network topologies. Again, similar to the above arrangement, the primary conductors 66a and 66b, as well as the respectively coupled tap conductors, may include switches that interrupt two phases of three-phase power to the appropriate downstream device. Again, load power may be independently interrupted to the downstream devices while maintaining operational power and data communication to these devices.

Figure 12:
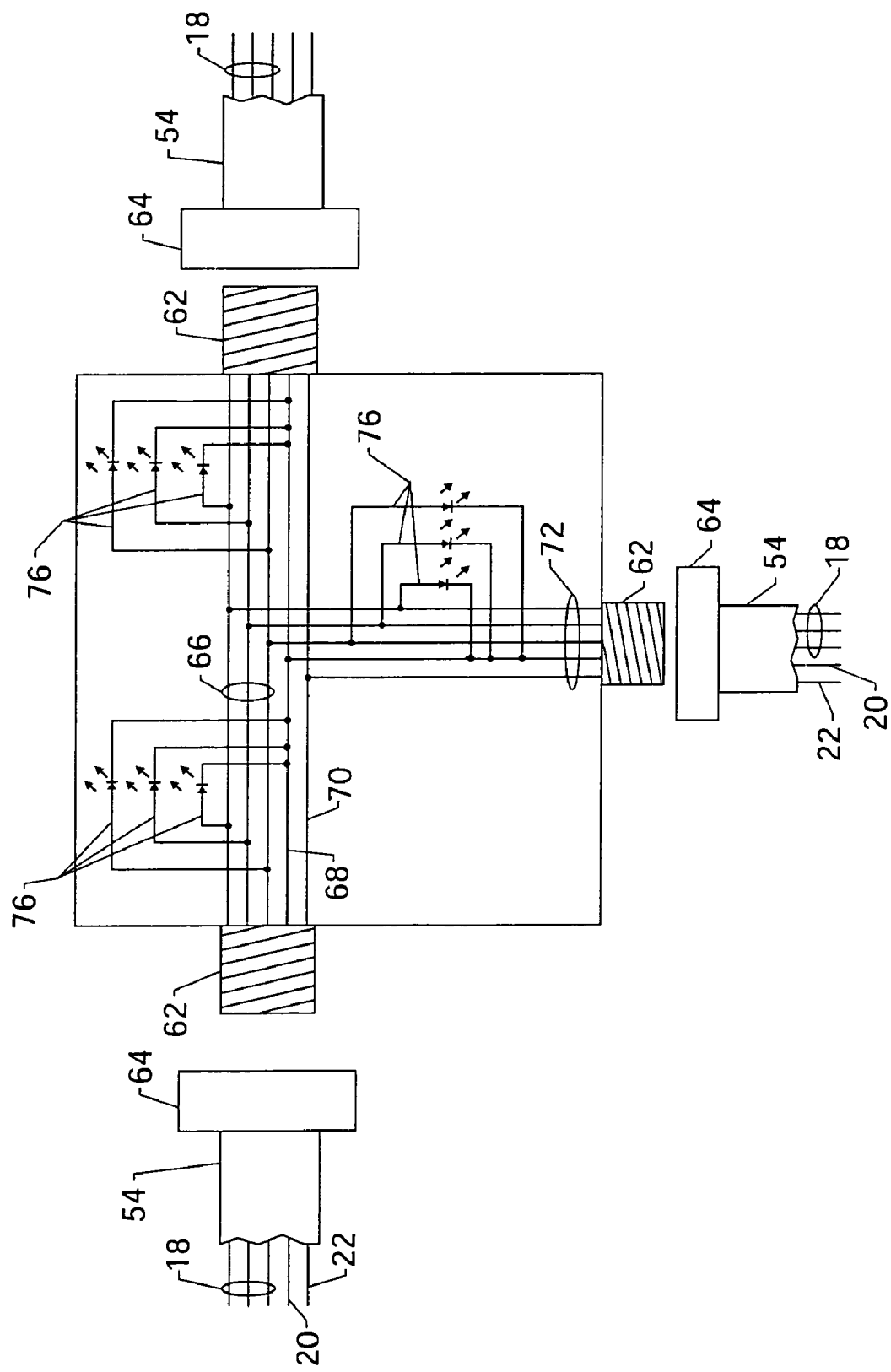
FIG. 12 is a schematic of a power and data transfer assembly including a plurality of indicators, such as LEDs electrically in parallel with each power conductor and corresponding branch conductors.

The power and data transfer assembly 40 may also be arranged to provide indications of whether problems, such as shorts circuits, exist upstream or downstream of the transfer assembly 40. Accordingly, the power and data transfer assembly 40 may include indicators disposed at appropriate locations on the power conductors 68a, 68b and 68c as well as on the corresponding tap conductor 72. As exemplified in FIG. 12, a set of LED indicators 76 may be coupled to each of the three-phase power conductors 66a, 66b, and 66c, both upstream of the tap conductor 72 as well as downstream of the tap conductors 72. In operation, in the event a power conductor 66a, 66b or 66c is damaged upstream of the power and data transfer assembly, all of the LED indicators coupled to the appropriate power conductor 66a, 66b or 66c, would show an inactive status. In contrast, should a problem occur downstream of assembly 40, and not in the tap device, the appropriate indicator 76 upstream of the tap conductors and on the tap conductors will show an active status, whereas the indicator downstream of the tap conductors will show an inactive status. Thus, an operator could easily determine that repairs must be conducted downstream of the appropriate assembly, advantageously reducing the time necessary to detect and address the problem.

Should problems similarly occur in the tap device the indicators on the appropriate conductors upstream and downstream of the tap conductors will indicate an active status, whereas the indicator on the respective tap conductors will show an inactive status. Again, by viewing this integrated indicator, the operator or repair technician would be easily able to determine along which path the problem has occurred. Again, advantageously, this may lead to reduced repair times and increased efficiencies.

Figure 13:
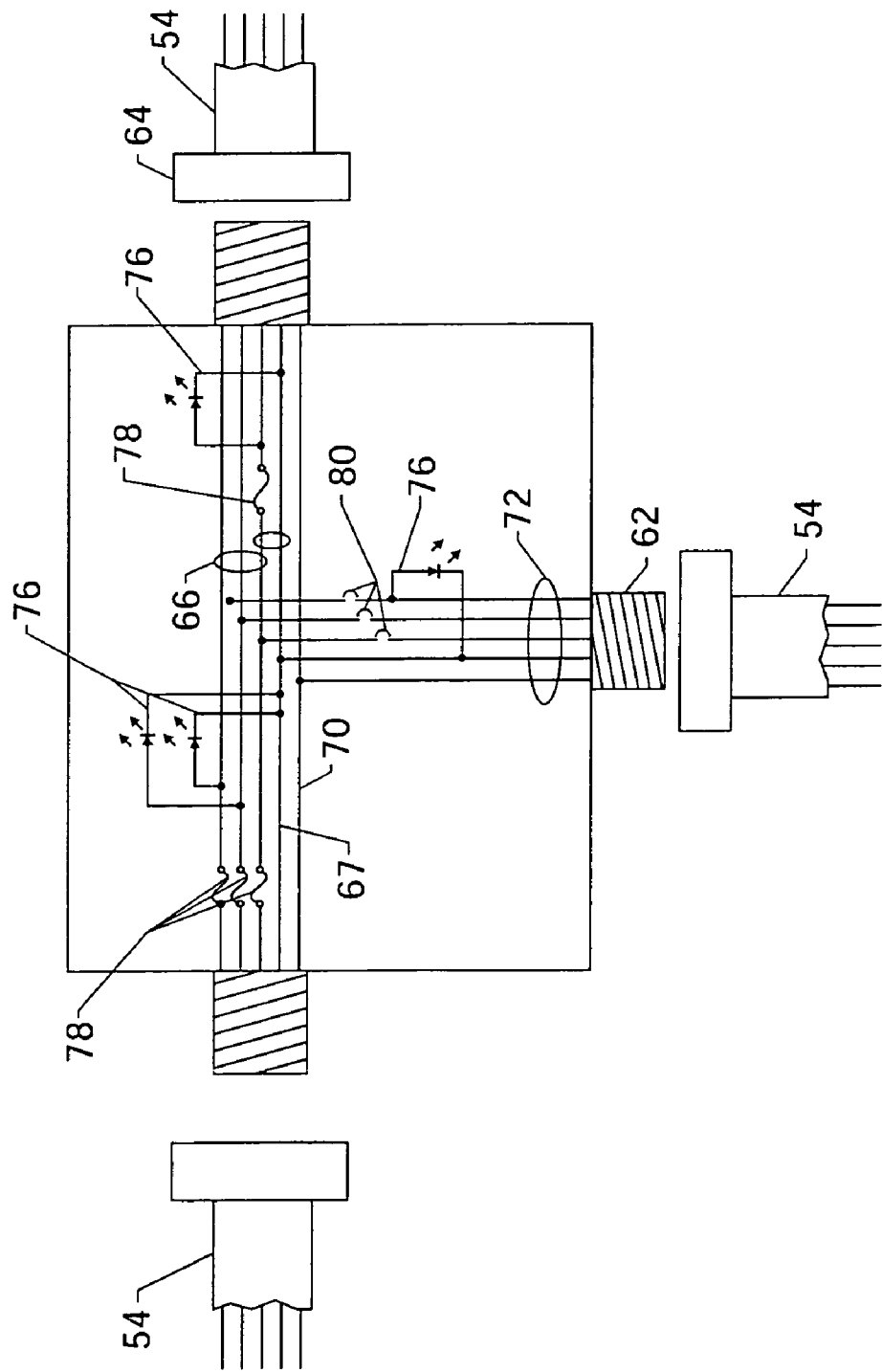
FIG. 13 is a schematic of a power and data transfer assembly including circuit protection components disposed on the power conductors, as well as the corresponding branch conductors, the assembly further including LED indicators.

The power and data transfer assembly may also include integrated circuit protection components, such as fuses 78 or circuit breakers 80 as illustrated in FIG. 13. If, for example, an inappropriate power level was conducted over any of the power conductors 66a, 66b or 66c, the appropriate fuse 78 or circuit breaker 80 would be triggered. Moreover, the protection components 78 and 80 may be configured to operate remotely in response to the appropriate data signals. That is, they may be configured to be triggered or reset in response to certain data signals transmitted over the appropriate conductors. Advantageously, indicators 76 may be coupled to the appropriate power conductors 66 downstream of the circuit protection components 78 or 80. Accordingly, if a fuse 78 or circuit breaker 80 is tripped, the indicator will so indicate, and as such tell the operator which fuse or circuit breaker has been tripped. In response, the maintenance technician or operator may simply replace the tripped fuse 78 or switch the circuit breaker back into a conducting position, or otherwise service the system. Indeed, the fuses 78 are adapted for easy separation from the remainder of the assembly 40. That is, the protection components 78 and 80 may be replaced without removal or disconnection of the remainder of the transfer assembly 40 from the network.

Figure 14:
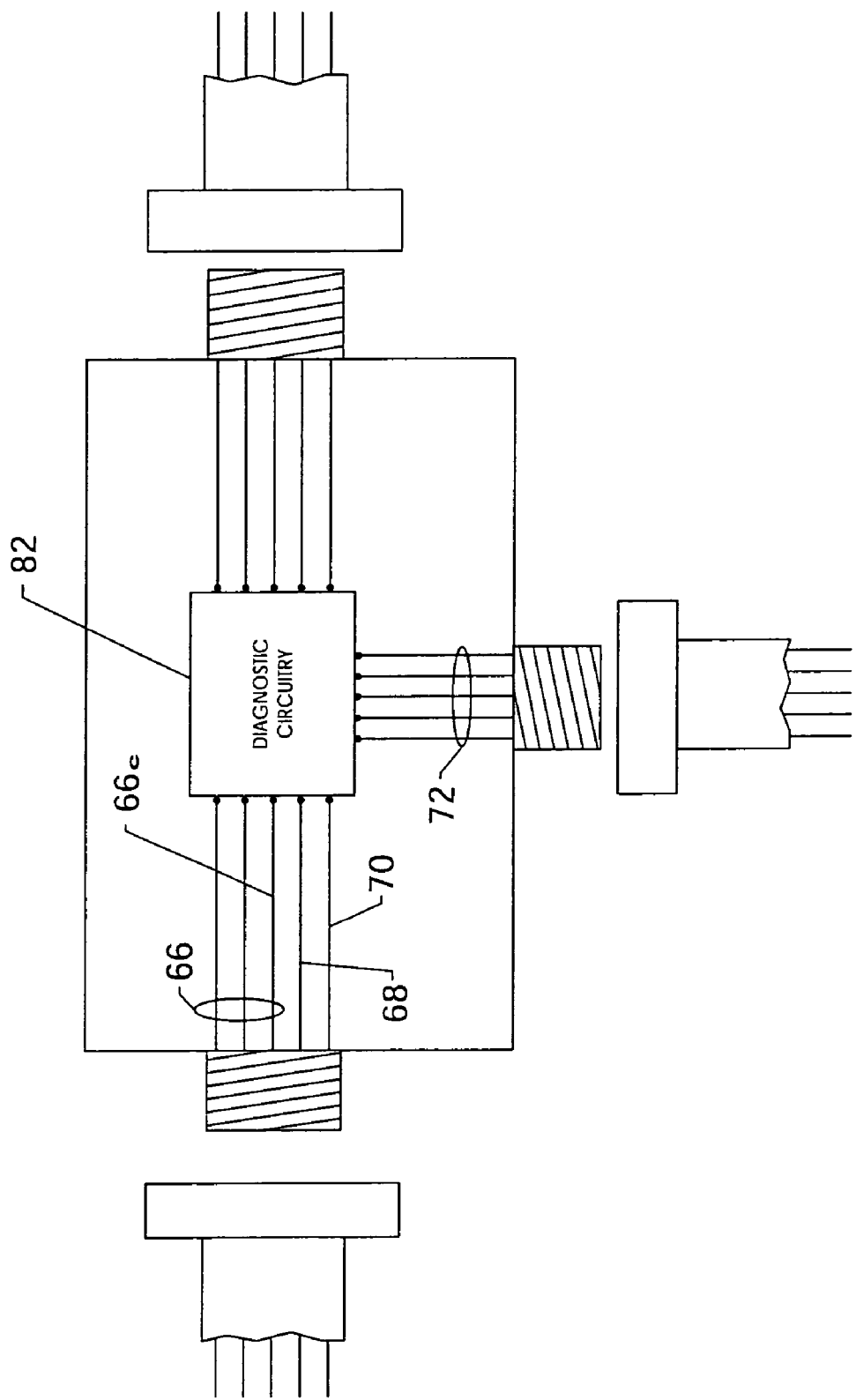
FIG. 14 is a schematic of a power and data transfer assembly including diagnostic circuitry coupled to primary conductors as well as to the branch conductors.

Another feature which may be integrated into the power and data transfer assembly is diagnostic circuitry 82. As illustrated in FIG. 14, the diagnostic circuitry may be coupled to all of the conductors within the power and data transfer assembly 40. Additionally, the diagnostic circuitry 82 may be configured so as to receive and transmit data signals over the appropriate power conductor 66c and neutral conductor 68 in accordance with the predetermined data communications protocol. Advantageously, the diagnostic circuitry may interpret both the data signals as well as the conditions of the power conductors and, with such information, determine where a problem or error may be occurring. In response, the diagnostic circuitry may then send a data signal to the appropriate network component, such as the controller 26 for display at a remote site (see FIG. 1). To facilitate computation and analysis of the various signals and power conditions, diagnostic circuitry may comprise a microprocessor, or any other suitable data processing and/or logic device. Moreover, the diagnostic circuitry may comprise a mechanism that facilitates verification of the connectivity of the transfer assembly 40 as well as the components to which it is coupled. For example, the diagnostic circuitry may comprise a mechanism for producing a test voltage and test current. The diagnostic circuitry may analyze the network system's response to the applied test voltage and current and, in turn, develop a diagnosis.

Figure 15:
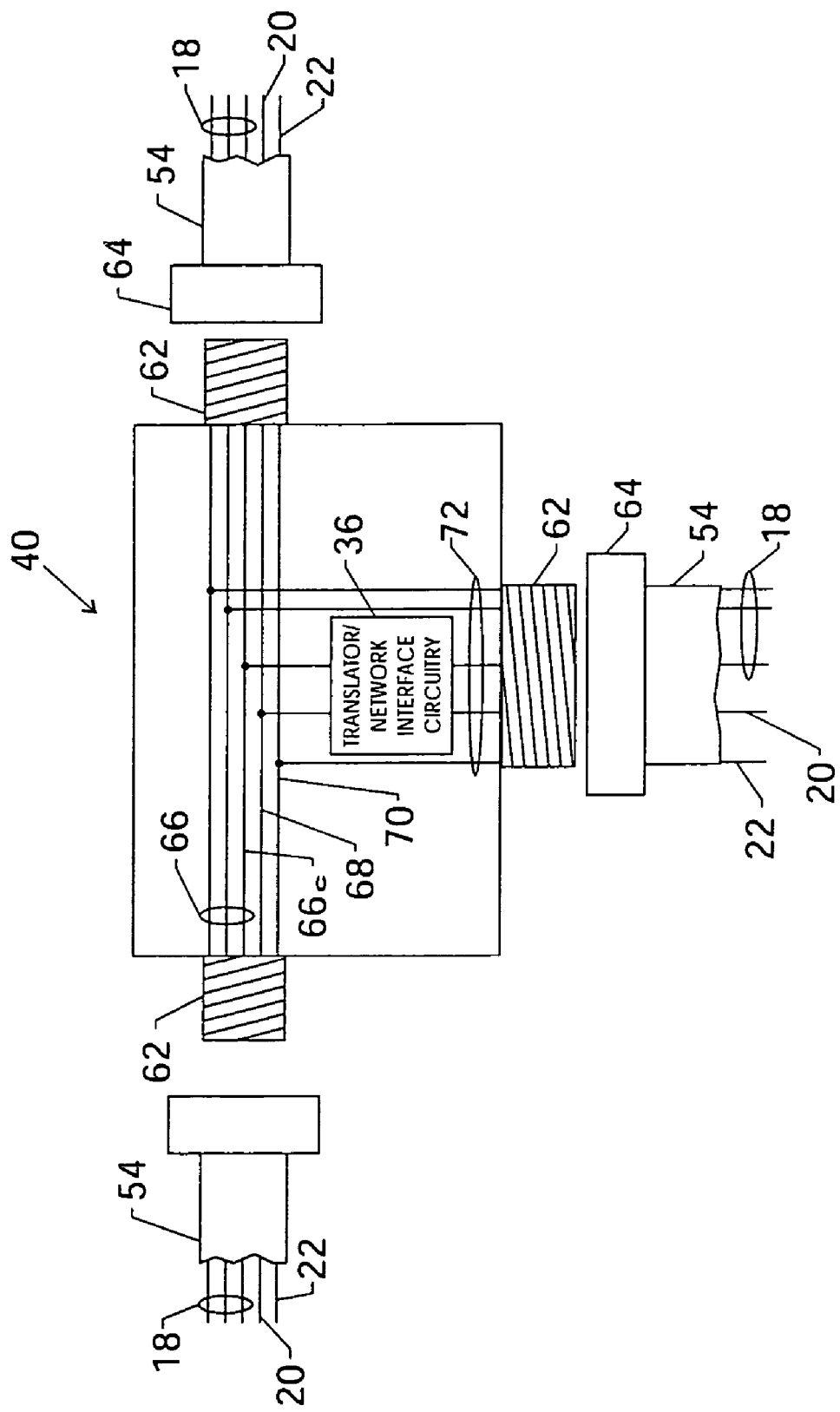
FIG. 15 is a schematic of a power and data transfer assembly including network interface circuitry coupled to appropriate branch conductors.

In many instances, a device coupled downstream of the power and data transfer assembly may not contain circuitry capable of receiving or sending data signals in accordance with the predetermined data communications protocol. Accordingly, as illustrated in FIG. 15, the power and data transfer assembly may include network interface circuitry 36 disposed therein. Advantageously, the network interface circuitry 36, as discussed above, receives data signals in accordance with the data communications protocol over the appropriate power conductor 66c and the neutral 68 and subsequently translates these signals for receipt by the downstream device. Moreover, the network interface circuitry 36 may receive signals from a downstream device and, in turn, translate the signals for distribution to the remainder of the system, again over the appropriate power conductor 66c and neutral conductor 68. Advantageously, by integrating this circuitry into the transfer assembly 40, additional components coupled between the assembly and the cable or downstream device are no longer necessary, thereby reducing manufacturing and installation costs.

Figure 16:
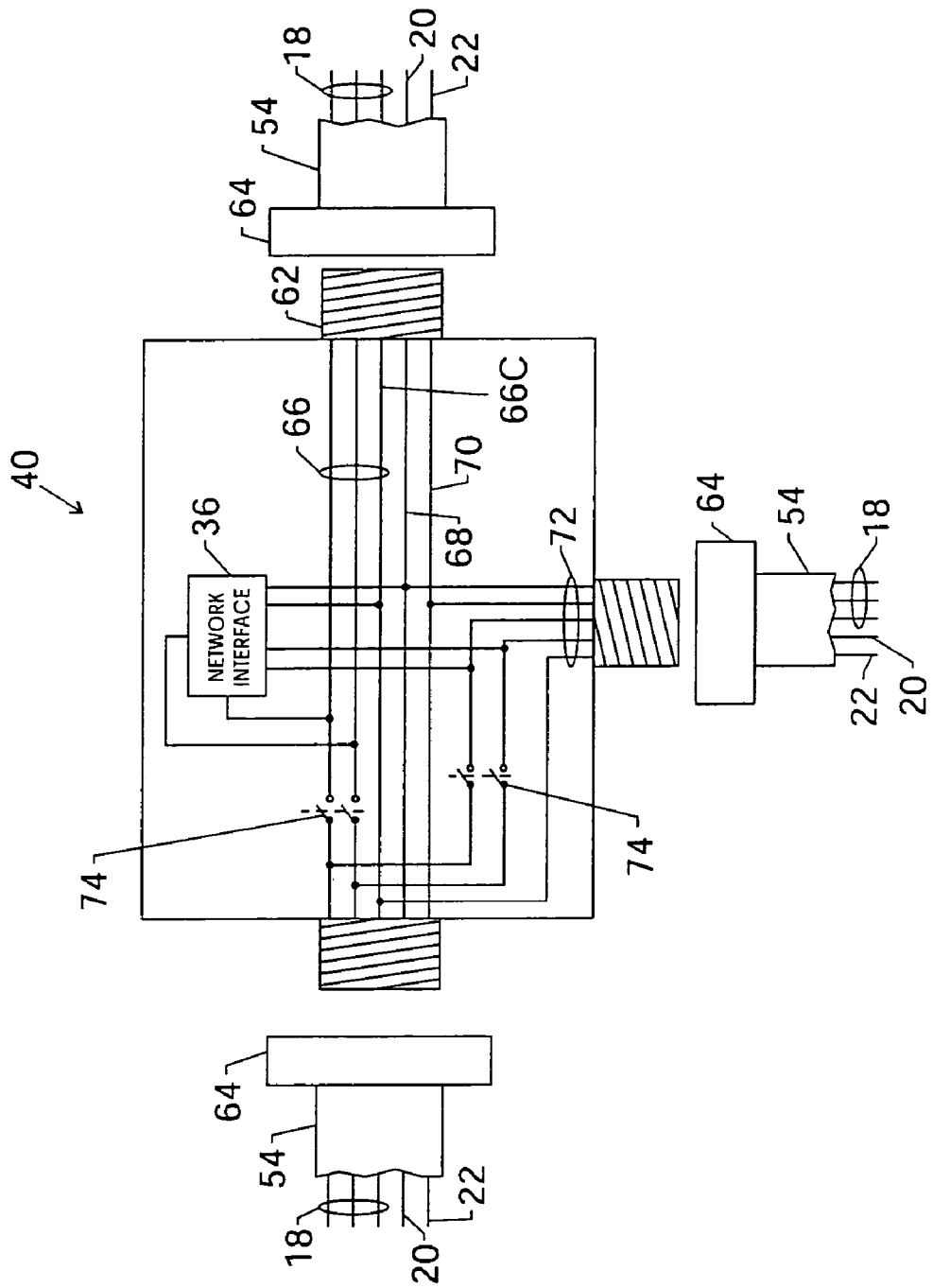
FIG. 16 is a schematic of a power and data transfer assembly including network interface circuitry coupled to the appropriate power conductors, and a plurality of switches disposed on both the primary conductors and the branch conductors.

Additionally, the network interface circuitry 36 may be coupled downstream of switches 74 as illustrated in FIG. 16. As such, the network interface circuitry 36 may be configured so as to interpret the status of the switches, i.e., open or closed, and translate this data into signals more appropriately transmittable in accordance with the predetermined data communications protocol.

Figure 17:
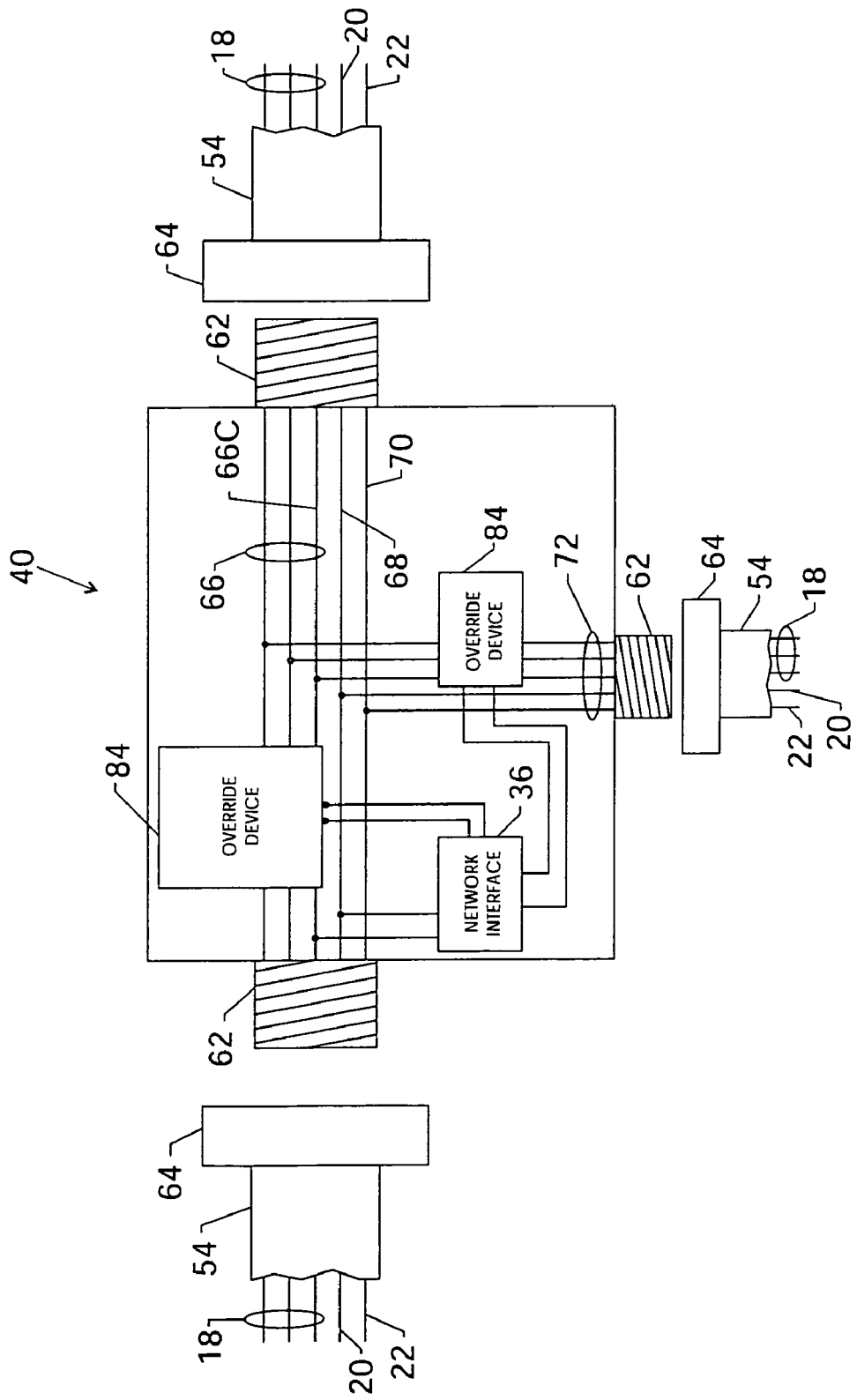
FIG. 17 is a schematic of a power and data transfer assembly comprising override devices disposed on both the primary conductors and the branch conductors, and coupled to network interface circuitry.
Figure 18:
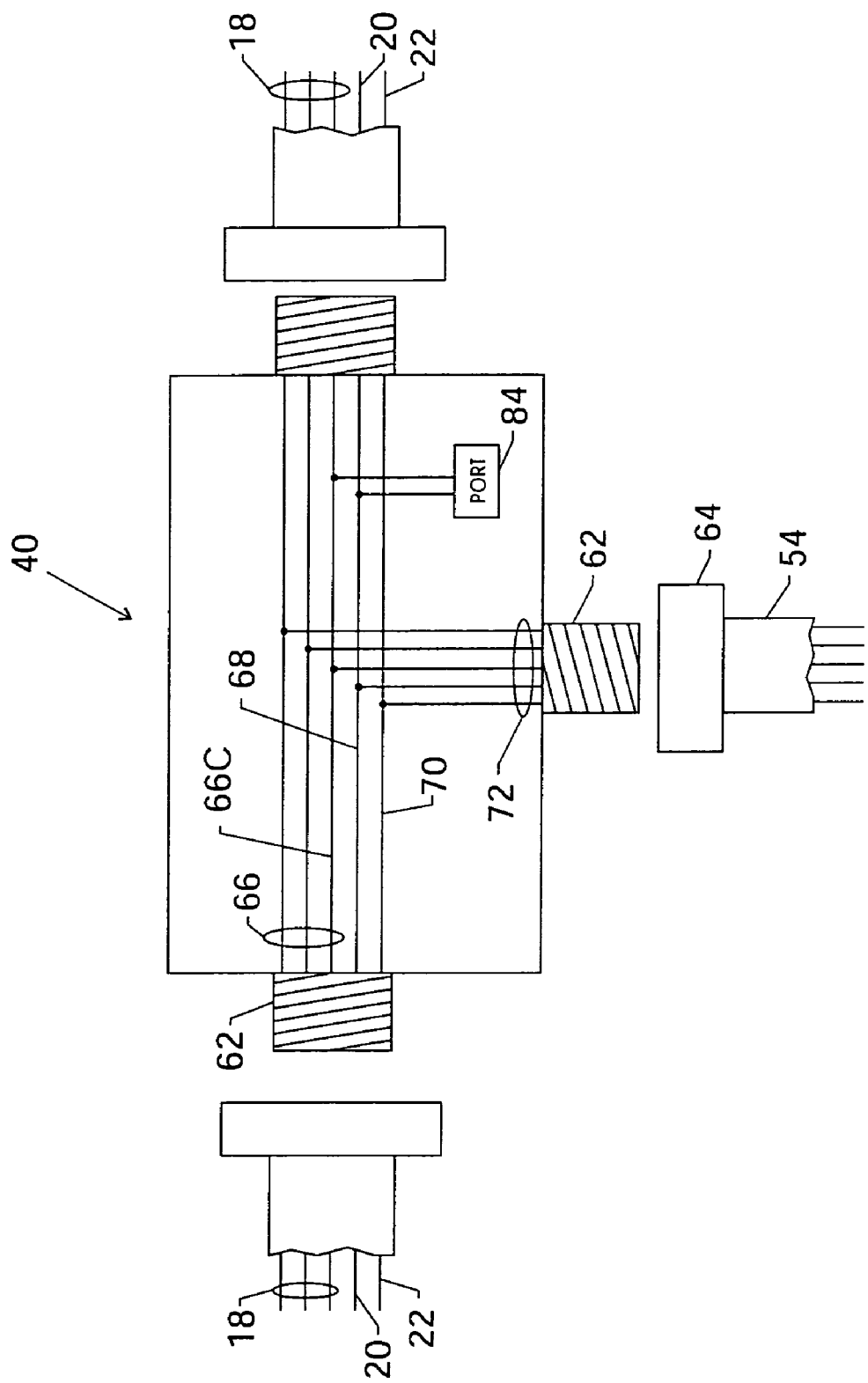
FIG. 18 is a schematic of a power and data transfer assembly including a data port coupled to both the appropriate primary conductors and branch conductors.

Not only may it be advantageous to note the condition of a switch, it also may be advantageous to control power transmission to devices downstream of the transfer assembly 40. Accordingly, the power and data transfer assembly may comprise override devices that are capable of interrupting any one or all of the three phases of power in response to an appropriate override protocol. As illustrated in FIG. 17, override devices 84 may be disposed within the power and data transfer assembly on the power conductors 66 both upstream and downstream of the tap connectors as well as on the respective tap power conductors. Additionally, the override devices 84 may be coupled to network interface circuitry 36.

In operation, override circuitry 48 (see FIG. 1) may determine, in response to an override protocol, that power to a specific device is to be interrupted. In turn, the override circuitry transmits a data signal over the power conductor 66c and neutral conductor 68 to network interface circuitry 36 disposed within the power and data transfer assembly 40. The network interface translates the signals into signals more appropriately understandable by the respective override devices. The signals may be such that they instruct the override device 84 to interrupt power to the appropriate downstream devices. As presented in the earlier example, an open press guard within the system may cause the override circuitry 48 to send a signal to the override device 84 to disengage power to the corresponding press motor.

Additionally, at many points during operation, it may be advantageous for a technician or operator to be able to determine what data signals are being transmitted through the power and data transfer assembly 40. Accordingly, the assembly 40 may comprise a data port 86. By coupling the data port 86 to the appropriate power conductor 66c and neutral conductor 68, a technician may be able to interface a remote device (not shown), such as a laptop computer or other interface module, to the power and data transfer assembly. The port then facilitates transmission of the data signals being conducted within the power and data transfer assembly to the interface module. Moreover, the transmission of data may also be conducted in accordance with a wireless protocol.

Indeed, the port 86 may comprise a radio frequency (rf) transmitter or a transmitter compatible with an IEEE 802.11 (b) or other wireless standard. These protocols may wirelessly communicate data with the exemplary laptop. Advantageously, the technician, via the interface module, may also be able to input data signals to the system 10 (see FIG. 1) via a port 86.

While the invention may be susceptible to various modifications and alternative forms, specific embodiments have been shown in the drawings and have been described in detail herein by way of example only. However, it should be understood that the invention is not intended to be limited to the particular forms disclosed. Indeed, one or more of the disconnects 44 or 74 may be multi-position or multiple position disconnects for interrupting two power conductors (e.g., a maintenance position), three power conductors (e.g., a service position), or for disconnecting one device or a series of devices. Additionally, the LED's may aid in indicating that no power is present, to permit the ready servicing of the devices without donning special gear or clothing. Clearly, the invention is to cover all modifications, equivalents, and alternatives falling within the spirit and scope of the invention as defined by the following appended claims.

What is claimed is:

1. A cable comprising:
    first, second and third electrical conductors configured to conduct a respective phase of three-phase power, the third conductor also configured to transmit data signals; and
    a fourth electrical conductor configured to transmit data signals in accordance with a data communications protocol in cooperation with the third conductor, wherein the cable is configured to interrupt two phases of three-phase power while concurrently transmitting one phase of three-phase power and the data signals to a device.

2. The cable as recited in claim 1, the cable having a substantially circular cross-section.

3. The cable as recited in claim 1, the cable having a substantially rectangular cross-section.

4. The cable as recited in claim 1, further comprising a fifth conductor configured to couple to an earth ground.

5. The cable as recited in claim 4, wherein the fifth conductor is at least partially disposed circumferentially about the first, second and third conductors.

6. The cable as recited in claim 1, wherein the first, second, third and fourth conductors each comprise individual jackets.

7. The cable as recited in claim 1, wherein the data signals include override signals in accordance with a predetermined override protocol in addition to the data communications protocol.

8. The cable as recited in claim 1, wherein the data signals include control or information signals in accordance with the data communications protocol.

9. A cable comprising:
    first, second and third electrical conductors configured to conduct a respective phase of three-phase power, the third conductor also configured to transmit data signals; and
    a fourth electrical conductor configured to transmit data signals in accordance with a data communications protocol in cooperation with the third conductor, wherein the data signals include override signals in accordance with a predetermined override protocol in addition to the data communications protocol.

10. The cable as recited in claim 9, further comprising a fifth conductor configured to couple to an earth ground.

11. The cable as recited in claim 10, wherein the fifth conductor is at least partially disposed circumferentially about the first, second and third conductors.

12. The cable as recited in claim 9, wherein the data signals include control or information signals in accordance with the data communications protocol.

13. The cable as recited in claim 9, wherein the cable is configured to interrupt two phases of three-phase power while concurrently transmitting one phase of three-phase power and the data signals to a device.

14. A cable comprising:
    first, second and third electrical conductors configured to conduct a respective phase of three-phase power, wherein only the third conductor is also configured to transmit data signals; and
    a fourth electrical conductor configured to transmit data signals in accordance with a data communications protocol in cooperation with the third conductor;
    wherein the cable is configured to interrupt two phases of three-phase power while concurrently transmitting one phase of three-phase power and the data signals to a device.

15. The cable as recited in claim 14, further comprising a fifth conductor configured to couple to an earth ground.

16. The cable as recited in claim 15, wherein the fifth conductor is at least partially disposed circumferentially about the first, second and third conductors.

17. The cable as recited in claim 14, wherein the first, second, third and fourth conductors each comprise individual jackets.

18. The cable as recited in claim 14, wherein the data signals include override signals in accordance with a predetermined override protocol in addition to the data communications protocol.

19. The cable as recited in claim 14, wherein the data signals include control or information signals in accordance with the data communications protocol.

* * * * *